(12) United States Patent
Matsubara et al.

(10) Patent No.: US 7,530,920 B2
(45) Date of Patent: May 12, 2009

(54) CONTROL APPARATUS OF ELECTRIC VEHICLE

(75) Inventors: Tooru Matsubara, Toyota (JP); Hiroatsu Endo, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 393 days.

(21) Appl. No.: 11/589,948

(22) Filed: Oct. 31, 2006

(65) Prior Publication Data

US 2007/0099748 A1    May 3, 2007

(30) Foreign Application Priority Data

Nov. 2, 2005    (JP) .............................. 2005-320115

(51) Int. Cl.
*B60K 1/04* (2006.01)
(52) U.S. Cl. .................................... 477/3; 477/5; 477/6
(58) Field of Classification Search ..................... 477/3, 477/5, 6
See application file for complete search history.

(56) References Cited

U.S. PATENT DOCUMENTS 7,306,544 B2 * 12/2007 Matsumura et al. ......... 477/180
7,324,885 B2 * 1/2008 Sah et al. ...................... 701/58
7,396,316 B2 * 7/2008 Tabata et al. ................ 477/107
7,416,514 B2 * 8/2008 Dell et al. ..................... 477/80

FOREIGN PATENT DOCUMENTS

| JP | A 06-319210 | 11/1994 |
| JP | A 10-023607 | 1/1998 |
| JP | A 2004-203219 | 7/2004 |
| JP | 2004-270891 | * 9/2004 |

* cited by examiner

*Primary Examiner*—Ha D. Ho
(74) *Attorney, Agent, or Firm*—Oliff & Berridge, PLC (57) ABSTRACT

The hybrid vehicle is provided with a power distribution mechanism (20) distributing a power of an internal combustion engine (16) to a wheel side output shaft (6) and a first motor generator (18), and a transmission (14) transmitting a power of a second motor generator (12) to the wheel side output shaft (6). An electronic control unit (30) executes a rotation synchronization control for synchronizing a rotation speed of the second motor generator (12) prior to the gear shift with a rotation speed after the gear shift at a time of gear shift of the transmission (14). In the case that a neutral request for shutting off a power transmission to the wheel side output shaft (6) is executed during an execution of the rotation synchronization control, an execution of the neutral control of shutting off the application of current to the first and second motor generators (18, 12) is inhibited until the execution of the rotation synchronization control is finished.

13 Claims, 3 Drawing Sheets

Fig.1

CONTROL APPARATUS OF ELECTRIC VEHICLE

BACKGROUND OF THE INVENTION

The present invention relates to a control apparatus of an electric vehicle provided with an electric motor and a transmission transmitting a power of the electric motor to a wheel side output shaft.

There has been known a hybrid vehicle which distributes a power of an internal combustion engine to a wheel side output shaft and a power generator, and transmits a power of an electric motor to the wheel side output shaft via a transmission (refer to Japanese Laid-Open Patent Publication No. 2004-203219).

In the hybrid vehicle described in Japanese Laid-Open Patent Publication No. 2004-203219, the structure is made such that a torque transmitted to the wheel side output shaft from the electric motor is increased and decreased by switching engagement and disengagement of a plurality of friction type engagement mechanisms provided in the transmission so as to change gear. Further, in the control apparatus described in the publication, in order to suppress a shift shock at a time of shifting gear, there is executed a rotation synchronization control synchronizing a rotation speed of the electric motor prior to the gear shift toward a rotation speed after the gear shift, at a time of gear shift of the transmission. For example, in the case that the gear is shifted to another gear of a higher reduction ratio, the rotation speed is adjusted in such a manner that the rotation speed of the electric motor becomes higher little by little in a shifting process of the gear. In the case that the gear is shifted to another gear of a lower reduction ratio, the rotation speed is adjusted in such a manner that the rotation speed of the electric motor becomes lower little by little in the shifting process of the gear.

In this case, in the hybrid vehicle, in the case that a shift lever or the like is operated by a driver, and it is detected that the operated position is a neutral position, the excitation of the power generator and the electric motor is shut off and the power generator and the electric motor are set in an idle running state, whereby there is generated a neutral state in which the power transmission to the wheel side output shaft is shut off.

In this case, if a neutral request for shutting off the power transmission to the wheel side output shaft as mentioned above is outputted during the execution of the rotation synchronization control, there is executed the neutral control of shutting off the application of current to the power generator and the electric motor on the basis of the request. If the neutral control is executed during the execution of the rotation synchronization control as mentioned above, the adjustment of the rotation speed of the electric motor through the rotation synchronization control is interrupted. Thus, there is a risk that a shift shock is generated from the transmission in some state of the engagement mechanism.

There is a risk that the shift shock as mentioned above is generated not only in the hybrid vehicle provided with the internal combustion engine and the electric motor, but also in an electric vehicle having a power source constituted only by an electric motor and transmitting the power to the wheel side output shaft via a transmission in the same manner.

SUMMARY OF THE INVENTION

Accordingly, it is an objective of the present invention to provide a control apparatus of an electric vehicle which can reliably suppress generation of a shift shock from a transmission in an electric vehicle in which a power of an electric motor is transmitted to a wheel side output shaft via a transmission.

To achieve the foregoing and other objectives and in accordance with one aspect of the present invention, a control apparatus of an electric vehicle is provided. The electric vehicle includes an electric motor, a wheel side output shaft for transmitting a power to drive wheels, and a transmission for transmitting a power of the electric motor to the wheel side output shaft. The control apparatus includes a determination section, a neutral control section, a synchronization control section, and a delay section. The determination section determines whether a neutral request for shutting off power transmission to the wheel side output shaft is generated. The neutral control section executes neutral control, in which the neutral control section shuts off application of current to the electric motor when it is determined that the neutral request is generated. The synchronization control section executes rotation speed synchronization control in which, at a time of gear shift of the transmission, the synchronization control section adjusts a rotation speed of the electric motor prior to the gear shift to a rotation speed that is set in accordance with a speed reduction ratio after the gear shift. When it is determined that the neutral request is generated during execution of the rotation synchronization control, the delay section delays the execution of the neutral control.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A control apparatus of a hybrid vehicle according to one embodiment of the present invention will be described below.

Figure 1:
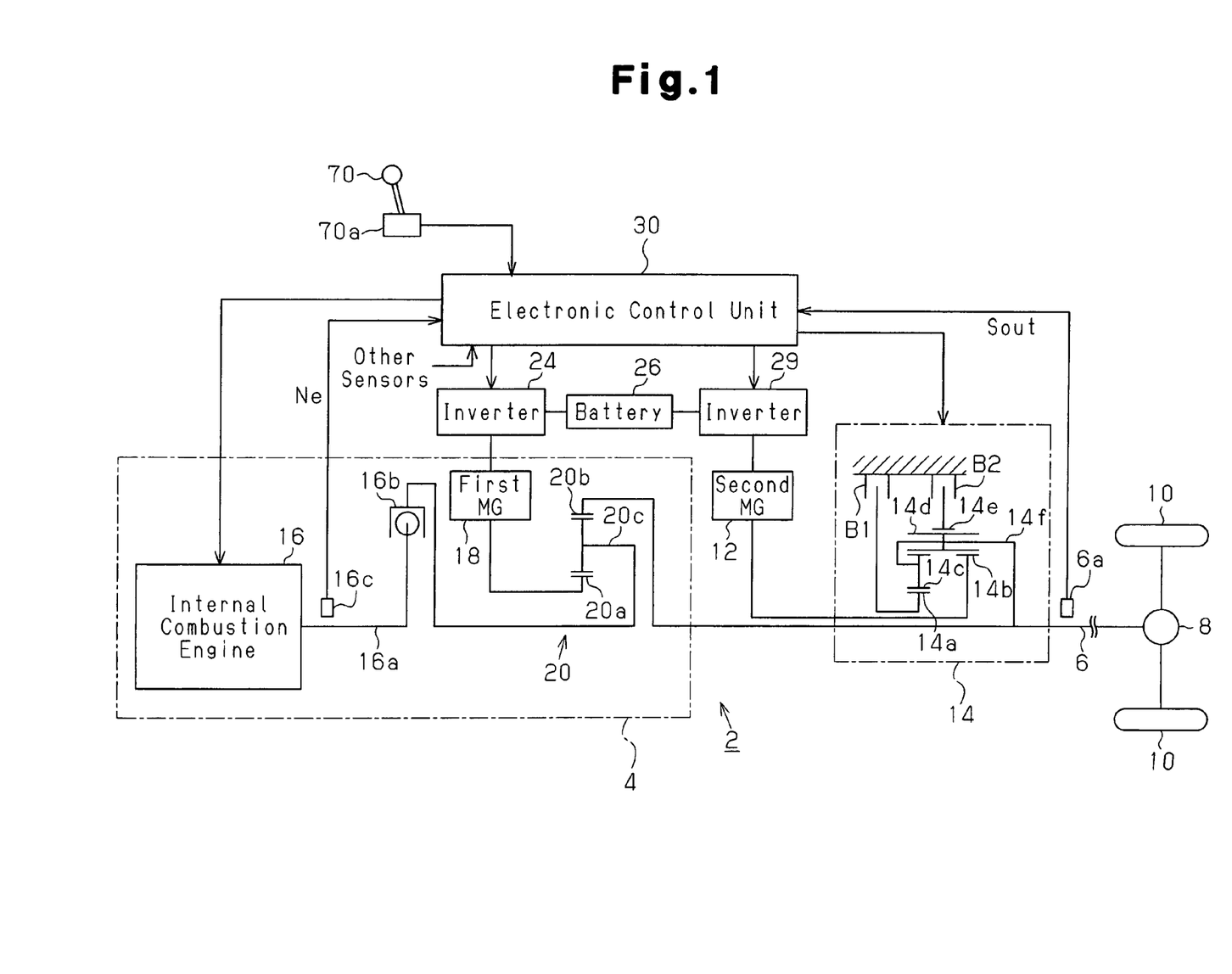
FIG. 1 is a block diagram showing a structure of a hybrid vehicle to which a control apparatus of a hybrid vehicle according to one embodiment of the present invention is applied.

FIG. 1 schematically shows the structure of a hybrid vehicle to which the control apparatus mentioned above is applied. A power source 4 generating a power is mounted on the hybrid vehicle. The power source 4 is constituted by an internal combustion engine 16, a first motor generator 18, a power distribution mechanism 20 distributing the power of the internal combustion engine 16 into a wheel side output shaft 6 and a first motor generator 18 and the like.

The internal combustion engine 16 is a power apparatus such as a gasoline engine, a diesel engine or the like, and an output torque thereof is adjusted by controlling an engine operation state such as an intake air amount, a fuel injection amount, an ignition timing or the like.

The first motor generator (hereinafter, referred to as first MG) 18 is connected to an electrical storage device, a battery 26 in this case via a first inverter 24, and basically serves as a power generator executing a power generation by utilizing a power of the internal combustion engine 16. However, in the case of the execution of a deceleration control or the like, it serves as an electric motor on the basis of a supply of an electric power. Further, the first inverter 24 is controlled, whereby a power generation amount and an output torque of the first MG 18 are adjusted.

The power distribution mechanism 20 is constituted by a planetary gear mechanism having a sun gear 20a, a ring gear 20b coaxially arranged with the sun gear 20a, a carrier 20c holding a pinion gear engaging with the sun gear 20a and the ring gear 20b in such a manner as to be freely rotate on its axis and freely revolve as constituting elements.

A crankshaft 16a of the internal combustion engine 16 is connected to the carrier 20c via a damper 16b, and the carrier 20c forms an input element. Further, a rotation shaft of the first MG 18 is connected to the sun gear 20a, and the sun gear 20a forms a reaction force element. Further, a wheel side output shaft 6 is connected to the ring gear 20b, and the ring gear 20b forms an output element.

The power of the internal combustion engine 16 is transmitted to the wheel side output shaft 6 via the power distribution mechanism 20, and the power transmitted to the wheel side output shaft 6 is transmitted to a wheel 10 via a differential gear 8.

Figure 2A:
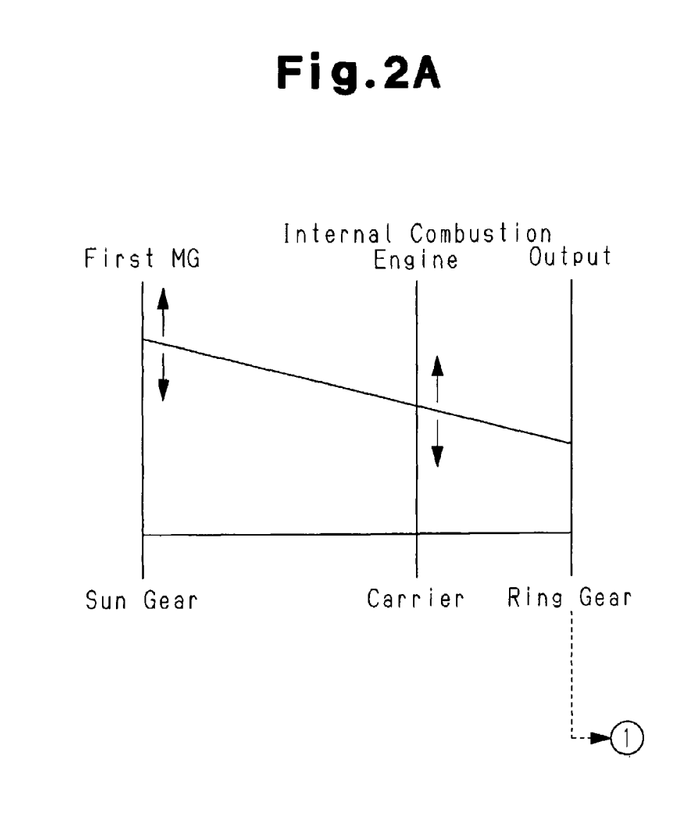
FIG. 2A is an alignment chart of a power distribution mechanism.

FIG. 2A shows an alignment chart of the power distribution mechanism 20 mentioned above. As shown in FIG. 2A, the power of the internal combustion engine 16 is distributed into the wheel side output shaft 6 and the first MG 18 via the power distribution mechanism 20. Further, for example, in the case that the rotation speed of the wheel side output shaft 6 is fixed, it is possible to continuously change the rotation speed of the internal combustion engine 16 by changing the rotation speed of the first MG 18. In other words, it is possible to effectively operate the internal combustion engine 16 through the control of the first MG 18.

Further, the hybrid vehicle is also provided with a second motor generator (hereinafter, refer to a second MG) 12 as a power source generating power. The second MG 12 corresponds to an electric motor executing a driving force control outputting a driving force for traveling the vehicle and a regenerative control collecting a kinetic energy. The second MG 12 is connected to the wheel side output shaft 6 via a transmission 14, and a drive torque transmitted to the wheel side output shaft 6 from the second MG 12 is increased and decreased in correspondence to a change gear ratio variably set in the transmission 14. Further, the second MG 12 is also connected to the battery 26 via a second inverter 29, and an output torque and a regenerative torque of the second MG 12 are adjusted on the basis of a control of the second inverter 29.

The transmission 14 is constituted by a set of Ravigneaux type planetary gear mechanisms. In other words, the transmission is provided with a first sun gear 14a and a second sun gear 14b, a short pinion 14c is engaged with the first sun gear 14a, and the short pinion 14c and the second sun gear 14b are engaged with a long pinion 14d. Further, the long pinion 14d is engaged with a ring gear 14e. The short pinion 14c and the long pinion 14d are held by a carrier 14f so as to freely rotate on its axis and freely revolve. In accordance with the structure mentioned above, the first sun gear 14a and the ring gear 14e form a double pinion type planetary gear mechanism provided with the short pinion 14c and the long pinion 14d, and the second sun gear 14b and the ring gear 14e form a single pinion type planetary gear mechanism provided with the long pinion 14d.

Further, the transmission 14 is provided with a first brake B1 that is a friction type engagement mechanism selectively fixing the first sun gear 14a, and a second brake B2 that is a friction type engagement mechanism selectively fixing the ring gear 14e. The first brake B1 and the second brake B2 are structured such that a torque capacity is continuously changed in correspondence to an engagement force utilizing a hydraulic pressure. In this case, the torque capacity may be continuously changed by an engagement force, for example, utilizing an electromagnetic force or the like, in addition to the hydraulic pressure.

Further the second MG 12 mentioned above is coupled to the second sun gear 14b, and the wheel side output shaft 6 is coupled to the carrier 14f. Accordingly, in the transmission 14, the second sun gear 14b corresponds to the input element, and the carrier 14f corresponds to the output element.

In the transmission 14 mentioned above, the gear of the transmission 14 is set to a high gear having a small speed reduction ratio by engaging the first brake B1 so as to fix the first sun gear 14a and disengage the second brake B2. On the other hand, the gear of the transmission 14 is set to a low gear having a large speed reduction ratio by engaging the second brake B2 so as to fix the ring gear 14e and disengage the first brake B1. The shift control of the transmission 14 mentioned above is executed by an electronic control unit 30 mentioned below on the basis of a traveling state such as a vehicle speed, a required driving force (an accelerator opening degree or the like) or the like. More specifically, the gear regions are previously set to a map (a shift chart), and in the case that the detected traveling state corresponds to a low vehicle speed state, or in the case that the required driving force is large, a low gear shift signal is outputted to the transmission 14 from the electronic control unit 30. Further, the states of the first brake B1 and the second brake B2 are controlled on the basis of the low gear shift signal, whereby the low gear is selected in the transmission 14. On the contrary, in the case that the detected traveling state corresponds to a high vehicle speed state, or in the case that the required driving force is small, a high gear shift signal is outputted to the transmission 14 from the electronic control unit 30, and the states of the first brake B1 and the second brake B2 are controlled on the basis of the high gear shift signal, whereby a high gear is selected in the transmission 14.

Figure 2B:
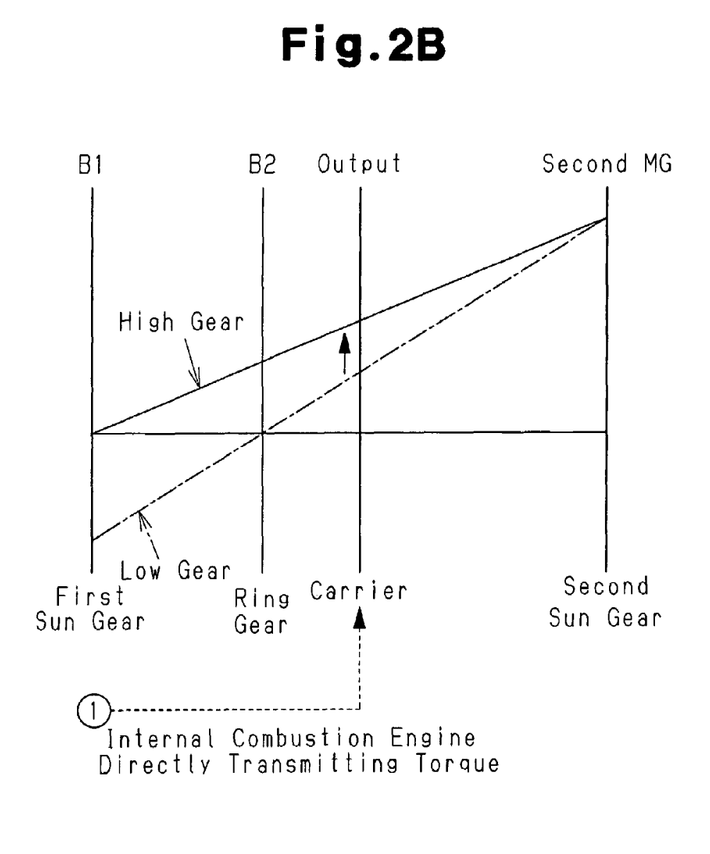
FIG. 2B is an alignment chart of a transmission.

FIG. 2B shows an alignment chart of the transmission 14. As shown in FIG. 2B, if the ring gear 14e is fixed and the low gear is set, the rotation speed of the carrier 14f with respect to the rotation speed of the carrier 14f with the respect to the rotation speed of the second MG 12 is decelerated in correspondence to the speed reduction ratio of the low speed state, and the driving torque transmitted to the wheel side output shaft 6 from the second MG 12 via the carrier 14f is increased in correspondence to the speed reduction ratio of the low gear. On the other hand, if the first sun gear 14a is fixed and the high gear is set, the rotation speed of the carrier 14f with respect to the rotation speed of the second MG 12 is changed in correspondence to the speed reduction ratio of the high gear. More specifically, the speed is more increased in comparison with the case that the low gear is set. Further, the driving torque transmitted to the wheel side output shaft 6 from the second MG 12 via the carrier 14f is changed in correspondence to the speed reduction ratio of the high gear. More specifically, the driving torque is more reduced in comparison with the case that the low gear is set.

As mentioned above, a drive efficiency or the like of the second MG 12 is maintained in a favorable state by setting the transmission 14 to the low speed state so as to incrase the driving torque transmitted to the wheel side output shaft 6 from the second MG 12, or setting the transmission 14 to the high gear so as to lower the rotation speed of the second MG 12.

Variization controls including an engine control such as a fuel injection control of the internal combustion engine 16, an ignition timing control, a control of the first MG 18 through the first inverter 24, a control of the second MG 12 through the second inverter 29, a gear shifting control of the transmission 14 and the like are executed by the electronic control unit 30. The electronic control unit 30 is structured such as to be provided with an input circuit receiving detection signals of the various sensors and the like, in addition to a central processing unit (CPU), a memory, and an output circuit outputting a control signal to a drive circuit of the controlled object mentioned above. As the detected signals inputted into the input circuit, for example, there are a signal of an engine rotation speed sensor 16c detecting the rotation speed of the crankshaft 16a, a signal of an output shaft rotation speed sensor 6a detecting an output shaft rotation speed Sout of the wheel side output shaft 6, a signal of an accelerator sensor detecting an operation amount of an accelerator pedal, a signal of a vehicle speed sensor detecting a rotation speed of a wheel 10, and the like. Further, there is inputted into the input circuit mentioned above a signal of a shift position sensor 70a detecting an operation position (a forward position, a backward position, a neutral position or the like) about a lever operated by the driver, that is, a shift lever 70 selecting a vehicle traveling mode (a forward, a backward, a neutral or the like).

As mentioned above, the hybrid vehicle is structured such that the driving torque transmitted to the wheel side output shaft 6 from the second MG 12 is increased and decreased by switching the engagement and the disengagement of the engagement mechanism such as the first brake B1 and the second brake B2 provided in the transmission 14 so as to change the gear. If the rotation speed of the second MG 12 is forcibly changed by switching the engagement of the first brake B1 and the second brake B2 at a time of gear shift of the transmission 14, there is a risk that a shift shock is generated from the transmission 14 due to the change of the rotation speed. Accordingly, the electronic control unit 30 executes a rotation synchronization control of adjusting the rotation speed of the second MG 12 prior to the gear shift to the rotation speed corresponding to the speed reduction ratio after the gear shift, that is, a synchronous rotation speed, at a time of gear shift of the transmission 14.

For example, in the case that the gear is shifted to another gear of a higher speed reduction ratio, that is, the gear is shifted to the low gear from the high gear, the rotation speed of the second MG 12 is controlled in such a manner that the rotation speed of the second MG 12 becomes higher little by little toward the synchronous rotation speed corresponding to the low gear, in a state in which both of the first brake B1 and the second brake B2 are once disengaged. Further, if the rotation speed of the second MG 12 reaches the synchronous rotation speed, the second brake B2 is going to be engaged little by little, and the output torque of the second MG 12, in other words, the rotation speed of the second MG 12 is adjusted in such a manner that the synchronous rotation speed can be maintained against the increase of the torque capacity of the second brake B2 in the engaging process. Further, if the second brake B2 is completely engaged, the rotation speed adjustment of the second MG 12 in accordance with the rotation synchronization control is finished.

Likewise, in the case that the gear is shifted to another gear of a lower reduction ratio, that is, in the case that the gear is shifted to a high gear from the low gear, the rotation speed of the second MG 12 is controlled in such a manner that the rotation speed of the second MG 12 becomes lower little by little toward the synchronous rotation speed corresponding to the high gear, in a state in which both of the first brake B1 and the second brake B2 are once disengaged. When the rotation speed of the second MG 12 reaches the synchronous rotation speed, the first brake B1 is engaged little by little, and the output torque of the second MG 12, in other words, the rotation speed of the second MG 12 is controlled in such a manner that the synchronous rotation speed can be maintained against the increase of the torque capacity of the first brake B1, in the engaging process. Further, if the first brake B1 is completely engaged, the rotation speed adjustment of the second MG 12 in accordance with the rotation synchronization control is finished. The electronic control unit 30 executing the rotation synchronization control mentioned above constitutes a synchronization control section.

On the other hand, in the hybrid vehicle mentioned above, in the case that the shift lever 70 is operated by the driver, and the operated position is detected as the neutral position, that is, in the case that it is determined by the electronic control unit 30 that the neutral request of interrupting the power transmission to the wheel side output shaft 6 exists, the application of current to the first MG 18 and the second MG 12 is shut off, and the first MG 18 and the second MG 12 are set to the idle running state. The traveling state of the hybrid vehicle is accordingly set to the neutral state in which the power transmission to the wheel side output shaft 6 is interrupted. The electronic control unit 30 shutting off the application of current to the first MG 18 and the second MG 12 in the case that it is determined that the neutral request exists constitutes a neutral control section. On the other hand, in a general vehicle in which a multistage automatic transmission and only an internal combustion engine are mounted, if the neutral request setting the traveling state to the neutral state is executed, the engagement mechanism such as the clutch, the brake or the like within the automatic transmission is disengaged. The traveling state of the vehicle is set to the neutral state on the basis of the disengagement of the engagement state in the engagement mechanism.

In the case that the engagement mechanism of the automatic transmission is disengaged on the basis of the neutral request, for example, in the case that the shift lever or the like is operated by the driver, and the operation position is changed to the forward traveling position or the like from the neutral position, it is necessary to change the operation state of the engagement mechanism to the engagement state from the disengagement state. Accordingly, it takes certain amount of time until the traveling state of the vehicle is actually changed with respect to the change request of the traveling state of the vehicle mentioned above, more specifically, it takes a long time to finish the change of the operation state of the engagement mechanism.

With regard to this point, in the hybrid vehicle, it is possible to set the traveling state of the vehicle to the neutral state by shutting off the application of current to the first MG 18 and the second MG 12 as mentioned above. In other words, it is possible to set the traveling state of the vehicle to the neutral state without executing the process of disengaging the first brake B1 and the second brake B2 shifting the gear of the transmission 14, and canceling the engagement.

Accordingly, in the present embodiment, in the case that the vehicle speed of the hybrid vehicle is equal to or more than a predetermined value and it is thus determined that the vehicle is under traveling, if it is determined that the neutral request exists, the following processes are executed. In other words, there is executed the neutral control for shutting off the application of current to the first MG 18 and the second MG 12, and the disengagement of the first brake B1 and the second brake B2 is not executed. Even when the request with respect to the traveling state of the vehicle is changed to the vehicle travel request for transmitting the power to the wheel side output shaft 6 from the neutral request for shutting off the power transmission to the wheel side output shaft 6, by setting the traveling state of the hybrid vehicle to the neutral state under the aspect mentioned above, it is not necessary to change the operation state of the first brake B1 and the second brake B2. Accordingly, as is different from the generation of the neutral state in the automatic transmission of the general vehicle as mentioned above, it is possible to save a necessary time for changing the operation state of the engagement mechanism such as the first brake B1 and the second brake B2. Therefore, it is possible to quickly change the actual traveling state of the hybrid vehicle in response to the request for changing the travel state as mentioned above, whereby it is possible to improve the responsiveness at a time of requesting the change.

In this case, if the neutral request for shutting off the power transmission to the wheel side output shaft 6 as mentioned above is generated, and the neutral control of shutting off the application of current to the first MG 18 and the second MG 12 is executed on the basis of this request during the execution of the rotation synchronization control mentioned above, the rotation speed adjustment of the second MG 12 through the rotation synchronization control is interrupted. As a result, it is impossible to adjust the rotation speed of the second MG 12 to the synchronous rotation speed at a time of gear shift of the transmission 14, and there is a risk that the shift shock is generated from the transmission 14.

For example, in the case that the vehicle traveling state comes to a coasting state (a state in which the accelerator pedal is operated so as to be fully released, and the hybrid vehicle travels in a coasting manner), if the vehicle speed is lowered to some extent, the shift motion of the transmission 14 is executed in such a manner as to shift the gear of the transmission 14 to the low gear from the high gear. Further, the rotation synchronization control mentioned above is executed in conjunction with the shift motion, and the rotation speed of the second MG 12 is increased to the synchronous rotation speed corresponding to the low gear. If the neutral request as mentioned above is generated during the execution of the rotation synchronization control, and the application of current to the first MG 18 and the second MG 12 is shut off on the basis of this request, the rotation speed adjustment of the second MG 12 through the rotation synchronization control is interrupted, it is impossible to increase the rotation speed of the second MG 12. As a result, it is impossible to adjust the rotation speed of the second MG 12 prior to gear shift, to the synchronous rotation speed corresponding to the low gear after the gear shift, and there is a risk that the shift shock is generated at a time of gear shift of the transmission 14.

Particularly, in the present embodiment, the structure is made such that the first and second brakes B1 and B2 are not disengaged even if the neutral request is generated. Accordingly, in the case that the neutral request is generated during the gear shift of the transmission 14, the operation corresponding to the shifting of the gear is continued with respect to the first and second brakes B1 and B2, in spite of the fact that the rotation synchronization control is interrupted by executing the neutral control. Therefore, there is a possibility that the rotation synchronization control is interrupted in a state in which a power transmission path constituted by the second MG 12, the transmission 14 and the wheel side output shaft 6 is connected in some cases, and there is a risk that a the shift shock generated from the transmission 14 becomes larger.

Accordingly, in the present invention, the structure is made such that in the case that the neutral request is generated during the execution of the rotation synchronization control, the generation of the shift shock from the transmission 14 as mentioned above is suppressed by executing a neutral control delay process for delaying the execution of the neutral control mentioned above and giving priority to the execution of the rotation synchronization control.

Figure 3:
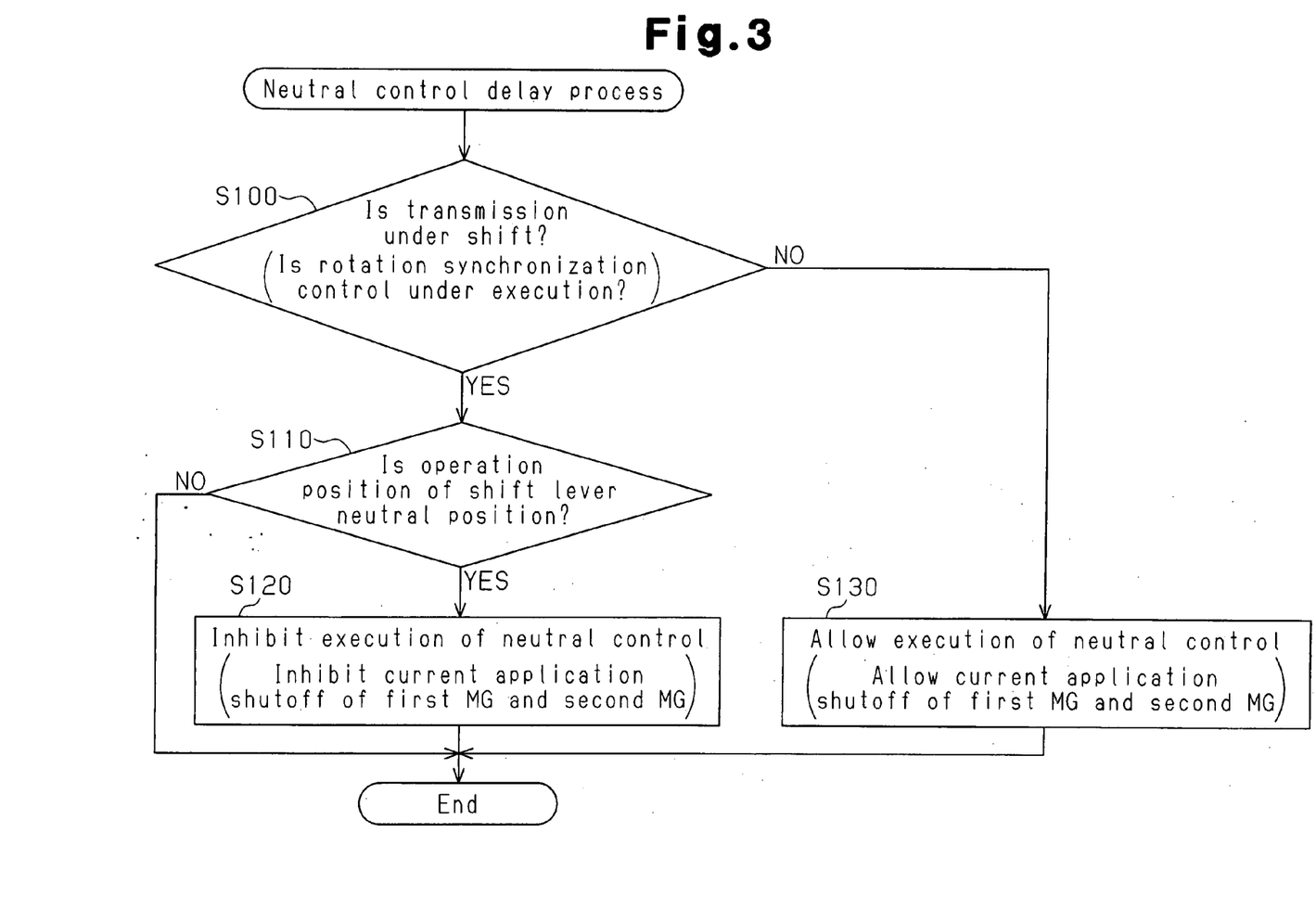
FIG. 3 is a flow chart showing a procedure of a neutral control delay process in the embodiment.

FIG. 3 shows a procedure of the neutral control delay process. In this case, the present process is repeatedly executed at every predetermined execution cycle by the electronic control unit 30. Further, the neutral control delay process constitutes a delay section.

If the present process is started, it is first judged whether or not the transmission 14 is in the gear shifting process, more specifically, whether or not it is under a coast downshift (S100). In this case, the coast downshift refers to a shift operation of shifting of the gear of the transmission 14 to the low gear from the high gear in the vehicle under a coasting state as mentioned above. Further, during the coast downshift, there are executed the engagement and disengagement control of the first brake B1 and the second brake B2, and the rotation synchronization control of the second MG 12, more specifically, the rotation speed control of increasing the rotation speed of the second MG 12 prior to the gear shift toward the synchronous rotation speed corresponding to the low gear after the gear shift. In this connection, in this step S100, an affirmative judgment is generated in the case that the accelerator pedal is in the full-release state, and the low gear shift signal is outputted to the transmission 14 from the electronic control unit 30.

Further, in the case that the transmission 14 is in the gear shifting process (YES in S100), it is judged whether or not the operation position of the shift lever 70 is the neutral position, that is, whether or not the neutral request by the driver exists (S110). In this case, an affirmative judgment is generated in the case that the signal of the shift position sensor 70*a* comes to a signal indicating the neutral position. In this case, the process of step S110 constitutes a determination section.

In the case that it is determined in step S110 that the operation position of the shift lever 70 is not the neutral position (NO in S110), the present process is temporarily finished without executing the delay process of the neutral control.

On the other hand, in the case that it is determined in step S110 that the operation position of the shift lever 70 is the neutral position (YES in S110), the execution of the neutral control is inhibited, in other words, the application of current interruption of the first MG 18 and the second MG 12 on the basis of the neutral request is inhibited (S120), and the present process is temporarily finished. In the case that the execution of the neutral control is inhibited in step S120, whereby the neutral request is generated during the execution of the rotation synchronization control, the execution of the neutral control is delayed and the execution of the rotation synchronization control is given priority. Accordingly, even in the case that the neutral request is generated during the execution of the rotation synchronization control, the rotation speed adjusting of the second MG 12 is continued without being interrupted, and the rotation speed of the second MG 12 prior to the gear shift is increased and adjusted toward the synchronous rotation speed corresponding to the low gear after the gear shift. Accordingly, it is possible to suppress the generation of the shift shock at a time of gear shift of the transmission 14.

On the other hand, in the case that it is judged in step S100 mentioned above that the transmission 14 is not in the gear shifting process (NO in S100), the execution of the neutral control is allowed (S130), in other words, the application of current interruption of the first MG 18 and the second MG 12 on the basis of the neutral request is allowed and the present process is temporarily finished. In the case that the execution of the neutral control is allowed in step S130, whereby the neutral request is generated during the execution of the rotation synchronization control, the application of current interruption of the first MG 18 and the second MG 12 is immediately executed, and the traveling state of the hybrid vehicle is set to the neutral state.

As mentioned above, in the case that it is determined that the neutral request exists during the execution of the rotation synchronization control, the execution of the neutral control is delayed. However, since the execution of the neutral control is inhibited until the execution of the rotation synchronization control is finished, it is possible to reliably avoid the execution of the neutral control during the execution of the rotation synchronization control, at time of the delay. Accordingly, it is possible to reliably synchronize the rotation speed of the second MG 12 prior to the gear shift toward the synchronous rotation speed after the gear shift at a time of executing the rotation synchronization control, whereby it is possible to reliably suppress the generation of the shift shock from the transmission 14.

As described above, in accordance with the present embodiment, it is possible to obtain the following advantages.

(1) In the case that the neutral request is executed during the execution of the rotation synchronization control for supplying the electric power to the second MG 12 so as to adjust the rotation speed, the execution of the neutral control shutting off the application of current to the first MG 18 and the second MG 12 is delayed. Accordingly, in the hybrid vehicle in which the power of the second MG 12 is transmitted to the wheel side output shaft 6 via the transmission 14, it is possible to reliably suppress the shift shock of the transmission 14 generated by the shutoff of the application of current to the second MG 12 during the execution of the rotation synchronization control.

(2) When delaying the execution of the neutral control, the execution of the neutral control is inhibited until the execution of the rotation synchronization control is finished, whereby it is possible to reliably avoid the execution of the neutral control during the execution of the rotation synchronization control. Accordingly, it is possible to reliably synchronize the rotation speed of the second MG 12 prior to the gear shift toward the synchronous rotation speed after the gear shift, at a time of executing the rotation synchronization control, whereby it is possible to reliably suppress the generation of the shift shock from the transmission 14.

(3) In the case that it is determined that the neutral request exists during the traveling of the hybrid vehicle, the neutral control is executed without disengaging the first brake B1 and the second brake B2 shifting of the gear of the transmission 14. Accordingly, when the request in accordance with the traveling state of the hybrid vehicle is changed to the vehicle traveling request from the neutral request, it is possible to quickly change the actual traveling state to the traveling state in response to the request, and it is possible to improve the responsiveness at a time of the change request.

On the other hand, in the case that the structure is made such that the first brake B1 and the second brake B2 are not disengaged even if the neutral request is generated, there is a risk that the shift shock generated from the transmission 14 becomes larger in the case that the neutral request is generated during the gear shift of the transmission 14. However, in the present embodiment, the structure is made such that the execution of the neutral control is delayed in the case that it is determined that the neutral request exists during the execution of the rotation synchronization control. Accordingly, in order to improve the responsiveness at a time of changing the traveling state of the hybrid vehicle as mentioned above, even in the case that the structure is made such that the first brake B1 and the second brake B2 are not disengaged even if the neutral request is generated, it is possible to suppress the shift shock generated from the transmission 14.

The embodiment mentioned above may be modified as follows.

The execution of the neutral control is inhibited until the execution of the rotation synchronization control is finished. In other words, the execution of the neutral control is delayed until the execution of the rotation synchronization control is finished. If the neutral control is executed in a state in which a difference between the rotation speed of the second MG 12 and the synchronous rotation speed is large, such as an execution early stage of the rotation synchronization control or the like, there is a risk that the great shift shock is generated from the transmission 14. On the other hand, in the case that the neutral control is executed in a state in which the difference between the rotation speed of the second MG 12 and the synchronous rotation speed becomes smaller to some extent, such as near the end of the execution of the rotation synchronization control or the like, the shift shock becomes smaller to some extent in comparison with the case that the neutral control is executed in the state of the large difference. Accordingly, it is judged, on the basis of the difference mentioned above or an elapsed time after the rotation synchronization control is started, whether or not the rotation speed of the second MG 12 comes close to the synchronous rotation speed to the extent that the shift shock can be suppressed to some extent (to the extent that the shift shock is allowable) even if the neutral control is executed. If the rotation speed of the second MG 12 comes close to the synchronous rotation speed to the extent that the shift shock can be suppressed to some extent, the execution of the neutral control may be started without waiting for the execution end of the rotation synchronization control. According to this modified embodiment, in the case that the neutral request is generated during the execution of the rotation synchronization control, the execution of the neutral control is delayed until the difference between the rotation speed of the second MG 12 and the synchronous rotation speed becomes smaller to some extent during the execution of the rotation synchronization control. Further, even in this case, in the hybrid vehicle in which the power of the second MG 12 is transmitted to the wheel side output shaft 6 via the transmission 14, it is possible to reliably suppress the shift shock of the transmission 14 generated by the shutoff of the application of current to the second MG 12 during the execution of the rotation synchronization control.

In step S100 mentioned above, it is judged whether or not the state of the transmission 14 is under the coast downshift, however, the judging condition in step S100 may be changed to other conditions as long as it is judged in step S100 whether or not the transmission 14 is in the gear shifting process, that is, whether or not the rotation synchronization control is executed.

For example, in the hybrid vehicle in the coasting state, even during the execution of the coast upshift corresponding to the shift operation of shifting of the gear of the transmission 14 to the high gear from the low gear, there are executed the engaging and disengaging control of the first brake B1 and the second brake B2, and the rotation synchronization control of the second MG 12. In the rotation synchronization control in this case, the rotation speed of the second MG 12 prior to the gear shift is decelerated toward the synchronous rotation speed corresponding to the high gear after the gear shift. However, since it is necessary to control the rotation speed of the second MG 12 toward the synchronous rotation speed in the decelerating process, the electric power is supplied to the second MG 12. Accordingly, even in the case that the neutral control is executed at a time when the rotation synchronization control is executed under the coast upshift, the rotation speed adjustment of the second MG 12 in accordance with the rotation synchronization control is interrupted, whereby there is a risk that the shift shock is generated from the transmission 14.

Accordingly, it is judged in step S100 mentioned above whether or not the state of the transmission 14 is under the coast upshift. In this case, at a time of the judgment whether or not it is under the coast upshift, the coast upshift can be determined in the case that the accelerator pedal is in the full-release state, and the high gear shift signal is outputted to the transmission 14 from the electronic control unit 30. Further, in the case that it is determined that the coast upshift is executed, the processes on and after step S110 may be executed, and in the case that it is determined that the coast upshift is not executed, the process of step S130 may be executed. Even in this case, it is possible to obtain the same advantages as those of the embodiment mentioned above.

Further, the rotation synchronization control mentioned above is also executed at a time of the shift operation of the transmission 14 in the normal traveling state in which the driving force is applied to the wheel side output shaft 6, in addition to the shift operation time (the shifting operation time of the gear) of the transmission 14 in the coasting state. Accordingly, in step S100 mentioned above, it may be determined that the transmission 14 is in the gear shifting process and the rotation synchronization control is executed, in the case that the low gear shift signal is outputted to the transmission 14 from the electronic control unit 30, and in the case that the high gear shift signal is output. In other words, the processes on and after S110 mentioned above may be also executed at a time of the shift operation of the transmission 14 in the normal traveling state. Even in this case, it is possible to obtain the same advantages as those of the embodiment mentioned above.

In the embodiment mentioned above, the structure is made such that the first brake B1 and the second brake B2 are not disengaged in the case that it is determined that the neutral request exists. However, even in the case that the states of the engagement mechanisms are controlled in accordance with the other aspects, there is a risk that the shift shock is generated from the transmission 14 not a little if the application of current to the second MG 12 is shut off during the execution of the rotation synchronization control. Accordingly, in the control apparatus which at least executes the neutral control for shutting off the application of current to the first MG 18 and the second MG 12 in the case that it is determined that the neutral request exists, and executes the rotation synchronization control mentioned above at a time of the gear shift of the transmission 14, the structure may be made such as to execute the neutral control delay process in accordance with the embodiment mentioned above or the modified embodiment thereof. Even in this case, it is possible to obtain the advantages described in the items (1) and (2) mentioned above, and the operations and effects in accordance with the modified embodiment.

In step S110, it is judged whether or not the neutral request is generated by the driver, on the basis of whether or not the operation position of the shift lever 70 is the neutral position. Alternatively, it may be judged whether or not the neutral request is generated by the driver on the basis of whether or not the operation position of the shift lever 70 is the forward position. In other words, in the case that the operation position of the shift lever 70 is the forward position, it is determined that the neutral request is not generated by the driver, and the neutral control delay process mentioned above is temporarily finished. On the other hand, in the case that the operation position of the shift lever 70 is not the forward position, it is determined that the neutral request is generated by the driver, and the process of step S120 mentioned above is executed. Even in this case, it is possible to obtain the same advantages as those of the embodiment mentioned above.

In the embodiment mentioned above, the structure is made such that the process of step S120 mentioned above is executed in the case that the neutral request is generated through the operation of the shift lever 70 by the driver, that is, in the case that the neutral request is outputted from the driver. Alternatively, the process in step S120 mentioned above may be executed in the case that the signal showing the neutral position is erroneously output due to an abnormality of the shift position sensor 70a or the like, or in the case that the neutral request is outputted from the electronic control unit 30 on the basis of various programs,. Even in this case, it is possible to reliably suppress the shift shock of the transmission 14 generated by the shutoff of the application of current to the second MG 12 during the execution of the rotation synchronization control.

In the embodiment mentioned above, the member operated by the driver, that is, the member for selecting the traveling mode (forward, backward, and neutral) of the vehicle is constituted by the shift lever 70, however, may be constituted by any member by which the driver can select the traveling aspect of the vehicle. For example, a switch, a touch panel or the like may be employed.

The transmission 14 mentioned above has two gears (the low gear and the high gear). Alternatively, the control apparatus of the hybrid vehicle in accordance with the present invention may be similarly applied to a transmission having three or more gears. In other words, the neutral control delay process on the basis of the same principle as the embodiment mentioned above may be executed at a time of changing the gear.

Further, in each of the embodiments mentioned above, the description is given of the case that the control apparatus in accordance with the present invention is applied to the hybrid vehicle provided with one transmission 14. Alternatively, the present invention may be similarly applied as a control apparatus of a hybrid vehicle provided with two or more transmissions. In other words, in the case that the hybrid vehicle is provided with a plurality of transmissions, the neutral control delay process on the basis of the same principle as the embodiment mentioned above may be executed at a time of the shift operation of the individual transmissions.

The transmission 14 is structured by a set of Ravigneaux type planetary gear mechanisms. However, the transmission 14 may be structured by any mechanism as long as the mechanism can shift the rotation of the second MG 12.

Further, the first brake B1 and the second brake B2 are constituted by the friction type engagement mechanism.

However, the brakes B1, B2 may be constituted by any other engagement mechanisms that can shift the gear of the transmission 14.

The power distribution mechanism 20 mentioned above is constituted by the planetary gear mechanism. However, the power distribution mechanism 20 may be constituted by any mechanism that can distribute the power of the internal combustion engine 16 to the wheel side output shaft 6 and the first MG 18.

In the embodiment mentioned above, the description is given of the case that the control apparatus in accordance with the present invention is applied to the hybrid vehicle provided with the internal combustion engine and the electric motor as the power source. In addition, there is a risk that the same disadvantage as that of the hybrid vehicle mentioned above is generated even in the case that the neutral control for shutting off the application of current to the electric motor is executed at a time when the neutral request shutting off the power transmission to the wheel side output shaft is generated in a electric vehicle having a power source constituted only by an electric motor, and transmitting the power to a wheel side output shaft via a transmission, and the rotation synchronization control is executed at a time when the transmission is shifted. In other words, even in an electric vehicle, if the neutral control is executed during the execution of the rotation synchronization control, the rotation speed adjustment through the rotation synchronization control is interrupted. Accordingly, in the same manner as the hybrid vehicle mentioned above, there is a risk that the shift shock is generated from the transmission. In this regard, the control apparatus in accordance with the present invention can be applied to the electric vehicle mentioned above. In this case, it is possible to obtain the same advantages as those of the case that the present invention is applied to the hybrid vehicle mentioned above, and it is possible to reliably suppress the shift shock mentioned above.

The invention claimed is:

1. A control apparatus of an electric vehicle, the electric vehicle including an electric motor, a wheel side output shaft for transmitting a power to drive wheels, and a transmission for transmitting a power of the electric motor to the wheel side output shaft, the control apparatus comprising:
   a determination section determining whether a neutral request for shutting off power transmission to the wheel side output shaft is generated;
   a neutral control section executing neutral control, in which the neutral control section shuts off application of current to the electric motor when it is determined that the neutral request is generated;
   a synchronization control section executing rotation speed synchronization control in which, at a time of gear shift of the transmission, the synchronization control section adjusts a rotation speed of the electric motor prior to the gear shift to a rotation speed that is set in accordance with a speed reduction ratio after the gear shift; and
   a delay section, wherein, when it is determined that the neutral request is generated during execution of the rotation synchronization control, the delay section delays the execution of the neutral control.

2. The apparatus according to claim 1, wherein the delay section inhibits the execution of the neutral control until the execution of the rotation synchronization control is finished.

3. The apparatus according to claim 1, wherein the delay section inhibits the execution of the neutral control until, during the execution of the rotation synchronization control, a difference between the actual rotation speed of the electric motor and the rotation speed that is set in accordance with the speed reduction ratio after the gear shift falls to or below a predetermined value.

4. The apparatus according to claim 1, wherein the transmission includes an engagement mechanism that shifts gear, and wherein, when executing the neutral control based on the determination that the neutral request is generated under traveling of the vehicle, the apparatus executes the neutral control without disengaging the engagement mechanism.

5. The apparatus according to claim 1, wherein the synchronization control section executes the rotation synchronization control when a gear of the transmission is shifted while the vehicle is coasting.

6. The apparatus according to claim 1, wherein the rotation synchronization control is executed when a gear of the transmission is shifted while the vehicle is traveling with a driving force being applied to the wheel side output shaft.

7. The apparatus according to claim 1, wherein the determination section determines whether the neutral request is generated based on an operation position of a shift lever used for selecting a traveling mode of the vehicle.

8. The apparatus according to claim 1, wherein the transmission includes a Ravigneaux type planetary gear mechanism.

9. The apparatus according to claim 1, wherein the apparatus changes a change gear ratio of the transmission based on at least one of a vehicle speed and a required driving force.

10. The apparatus according to claim 1, wherein the electric vehicle is a hybrid vehicle that includes, as power sources, an internal combustion engine and the electric motor.

11. The apparatus according to claim 10, wherein the hybrid vehicle includes a power distribution mechanism that distributes a power of the internal combustion engine to the wheel side output shaft and a power generator.

12. The apparatus according to claim 11, wherein the power distribution mechanism includes a planetary gear mechanism.

13. The apparatus according to claim 11, wherein the neutral control section shuts off application of current to the power generator when executing the neutral control.

* * * * *